US010559278B2

(12) United States Patent
Du et al.

(10) Patent No.: US 10,559,278 B2
(45) Date of Patent: Feb. 11, 2020

(54) DISPLAY APPARATUS, GATE DRIVER AND METHOD FOR CONTROLLING THE SAME

(71) Applicants: BOE TECHNOLOGY GROUP CO., LTD., Beijing (CN); Hefei Xinsheng Optoelectronics Technology Co., Ltd., Hefei, Anhui (CN)

(72) Inventors: Ruifang Du, Beijing (CN); Tong Yang, Beijing (CN); Xiaoye Ma, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 16/056,912

(22) Filed: Aug. 7, 2018

(65) Prior Publication Data

US 2019/0251928 A1 Aug. 15, 2019

(30) Foreign Application Priority Data

Feb. 12, 2018 (CN) .......................... 2018 1 0145490

(51) Int. Cl.
*G06F 3/038* (2013.01)
*G09G 5/00* (2006.01)

(52) U.S. Cl.
CPC ..... *G09G 5/006* (2013.01); *G09G 2310/0267* (2013.01); *G09G 2310/08* (2013.01); *G09G 2330/12* (2013.01)

(58) Field of Classification Search
CPC ........... G09G 5/006; G09G 2310/0267; G09G 2310/08; G09G 2330/12; G09G 2310/0286
USPC .......................................................... 345/213
See application file for complete search history.

(56) References Cited

U.S. PATENT DOCUMENTS

2008/0129761 A1* 6/2008 Kim ..................... G09G 3/2096 345/690
2009/0201231 A1* 8/2009 Takahara ............. G09G 3/3233 345/76
2011/0169800 A1* 7/2011 Jun ...................... G09G 3/3644 345/211
2015/0317936 A1* 11/2015 Yang .................... G09G 3/3677 345/100

* cited by examiner

*Primary Examiner* — Jonathan M Blancha
(74) *Attorney, Agent, or Firm* — Kinney & Lange, P.A.

(57) ABSTRACT

Embodiments of the disclosure provide a gate driver, a display apparatus and a method for controlling the gate driver. The gate driver comprises a plurality of clock signal terminals; a controlling signal terminal; and N stages of cascaded gate driving circuits. Each of the N stages of cascaded gate driving circuits is configured to pull-up a voltage of an outputting terminal of the gate driving circuit according to a signal at the respective clock signal terminal, and to perform a noise reduction operation according to a signal at the controlling signal terminal. A controller is coupled with the clock signal terminals and the controlling signal terminal, and is configured to detect signals at the plurality of clock signal terminals, and to output a valid level signal to the controlling signal terminal in response to the signal at the clock signal terminal being abnormal.

12 Claims, 7 Drawing Sheets

DISPLAY APPARATUS, GATE DRIVER AND METHOD FOR CONTROLLING THE SAME

CROSS-REFERENCE TO RELATED APPLICATION(S)

This application claims a priority of Chinese Patent Application No. 201810145490.2 filed on Feb. 12, 2018, the disclosure of which is incorporated herein by reference in its entirety as part of this application.

TECHNICAL FIELD

The present disclosure relates to a field of display, and more particularly to a gate driver, a display apparatus and a method for controlling the gate driver.

BACKGROUND

A display apparatus may play pictures at different frequencies. When the frequency is switched during the same frame, a clock signal CLK is prone to frame loss and the like, resulting in a multiple outputs phenomenon.

SUMMARY

An aspect of embodiments of the present disclosure provides a gate driver comprising: a plurality of clock signal terminals; a controlling signal terminal; N stages of cascaded gate driving circuits, wherein each of the N stages of cascaded gate driving circuits is coupled with the controlling signal terminal and a respective clock signal terminal of the plurality of clock signal terminals; wherein each of the N stages of cascaded gate driving circuits is configured to pull-up a voltage of an outputting terminal of the gate driving circuit according to a signal at the respective clock signal terminal, and to perform a noise reduction operation according to a signal at the controlling signal terminal, wherein N is an integer greater than 1; and a controller, wherein the controller is coupled with the plurality of clock signal terminals and the controlling signal terminal, and configured to detect signals at the plurality of clock signal terminals, and to output a valid level signal to the controlling signal terminal in response to the signal at at least one of the plurality of clock signal terminals being abnormal, so as to enable the N stages of cascaded gate driving circuits to perform the noise reduction operation.

For example, the plurality of clock signal terminals are divided into P groups of clock signal terminals, each group of clock signal terminals comprises two clock signal terminals, and signals applied to the two clock signal terminals are inverted from each other, wherein P is a positive integer; wherein the controller is further configured to: compare signals at the two clock signal terminals in each group, and in response to levels of the signals at the two clock signal terminals being the same, determine that at least one of the signals is abnormal; and output the valid level signal to the controlling signal terminal, in response to determining that the at least one of the signals is abnormal.

For another example, each of the N stages of cascaded gate driving circuits comprises a pulling-up sub-circuit, a drive control sub-circuit, and a pulling-down sub-circuit, wherein the pulling-up sub-circuit has a first terminal coupled with the drive control sub-circuit at a first node, a second terminal coupled with the respective clock signal terminal, and a third terminal coupled with the outputting terminal of the gate driving circuit; the pulling-down sub-circuit has a first terminal coupled with the first node, a second terminal coupled with the outputting terminal of the gate driving circuit, and a third terminal coupled with the controlling signal terminal, and the pulling-down sub-circuit is configured to pull-down the voltage of the first node and the outputting terminal of the gate driving circuit in response to the controlling signal terminal is at the valid level.

For another example, the pulling-down sub-circuit comprises a first transistor and a second transistor; the first transistor has a gate coupled with a gate of the second transistor and the controlling signal terminal, a first electrode coupled with the first node and a second electrode coupled with a first power supply terminal, and the second transistor has a first electrode coupled with the outputting terminal of the gate driving circuit and a second electrode coupled with the first power supply terminal.

For another example, each of the N stages of gate driving circuits has an inputting terminal, a first resetting terminal, and a second resetting terminal; wherein when P is equal to 1, the $j^{th}$ stage of the gate driving circuit has its inputting terminal coupled with the outputting terminal of the $(j-1)^{th}$ stage of the gate driving circuit, its first resetting terminal and its second resetting terminal coupled with the outputting terminal of the $(j+1)^{th}$ stage of the gate driving circuit, $j=2, \ldots, (N-1)$.

For another example, each of the N stages of gate driving circuits has an inputting terminal, a first resetting terminal, and a second resetting terminal; wherein when P is greater than 1, the $j^{th}$ stage of the gate driving circuit has its inputting terminal coupled with the outputting terminal of the $(i-P)^{th}$ stage of the gate driving circuit, its first resetting terminal coupled with the outputting terminal of the $(i+P)^{th}$ stage of the gate driving circuit and its second resetting terminal coupled with the outputting terminal of the $(i+P+1)^{th}$ stage of the gate driving circuit, $i=(P+1), \ldots, (N-1-P)$.

For another example, the P groups of the clock signal terminals comprise 2P clock signal terminals, and the 2P clock signal terminals are sequentially coupled with the $n^{th}$ stage to the $(n+2P-1)^{th}$ stage of the gate driving circuits, and signals at the 2P clock signal terminals are sequentially shifted by a preset phase so that the signal at the $m^{th}$ clock signal terminal and the signal at the $(P+m)^{th}$ clock signal terminal are inverted to each other, wherein $m=1, 2, \ldots, P$, $n=1, 2, \ldots, (N-2P+1)$.

For another example, the controller comprises a logic circuit configured to output a first level signal in response to the levels of the signals at the two clock signal terminals being the same, and to output the valid level signal according to the first level signal.

Another aspect of the embodiments of the present disclosure provides a display apparatus comprising the gate driver of the embodiments of the present disclosure.

Yet another aspect of the embodiments of the present disclosure provides a method for controlling the gate driver, the gate driver comprising a plurality of clock signal terminals, a controlling signal terminal, and N stages of cascaded gate driving circuit, wherein each of the N stages of cascaded gate driving circuits is coupled with a controlling signal terminal and a respective clock signal terminal of a plurality of clock signal terminals respectively, wherein N is an integer greater than 1, the method comprises: detecting signals at the plurality of clock signal terminals, and outputting an valid level signal to the controlling signal terminal in response to the signal at at least one of the plurality of clock signal terminals becomes abnormal, so as to enable the N stages of cascaded gate driving circuits to perform a noise reduction operation.

For example, the plurality of clock signal terminals are divided into P groups of clock signal terminals, each group of clock signal terminals comprises two clock signal terminals, and signals applied to the two clock signal terminals are inverted to each other, wherein P is a positive integer; wherein detecting signals at the plurality of clock signal terminals comprises: comparing signals at the two clock signal terminals in each group, and determining that at least one of the signals is abnormal, in response to the levels of the signals at the two clock signal terminals being the same; and outputting the valid level signal to the controlling signal terminal, in response to determining that the at least one of the signals is abnormal.

Still another aspect of the embodiments of the present disclosure provides a non-transitory readable storage medium storing a program for controlling a gate driver, when being performed by a processor, the program implements the method for controlling the gate driver of the embodiments of the disclosure.

BRIEF DESCRIPTION OF THE DRAWINGS

The above and/or additional aspects and advantages of the embodiments of the present disclosure will become apparent and easily understood from the description of the embodiments in combination with the drawings, in which.

DETAILED DESCRIPTION

Figure 1:
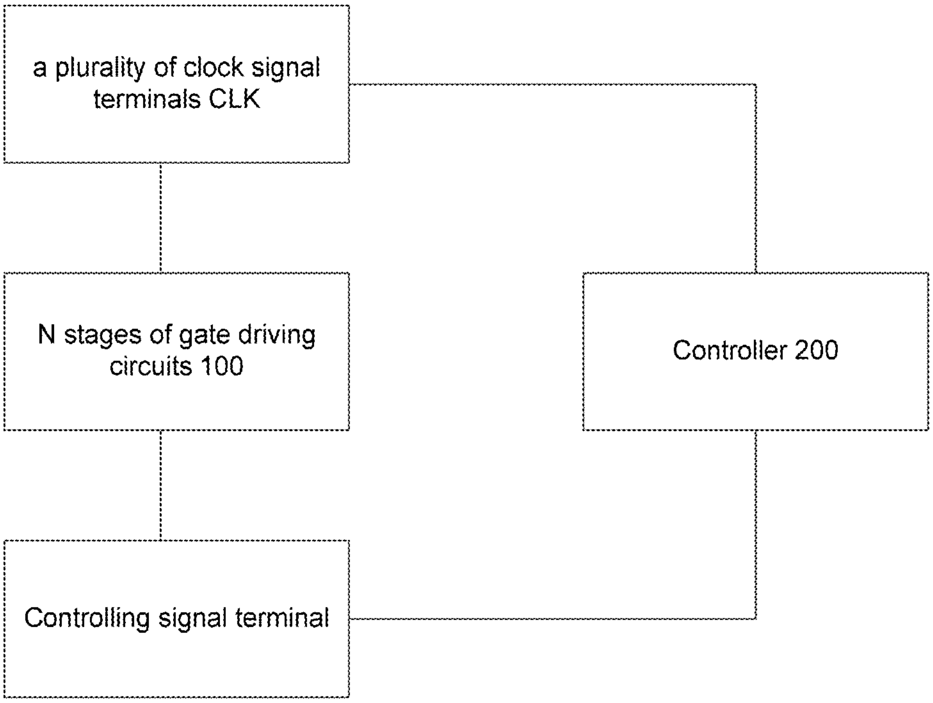
FIG. 1 shows a block schematic diagram illustrating a gate driver according to an embodiment of the present disclosure.

Embodiments of the present disclosure are described in detail below. Examples of the embodiments are illustrated in the drawings, wherein the same or similar reference numerals are used to indicate the same or similar elements or elements having the same or similar functions. The embodiments described below with reference to the accompanying drawings are intended to be illustrative of the embodiments of the invention, and are not to be construed as limiting.

A gate driver, a display device, and a method for controlling the gate driver according to the embodiments of the present disclosure will be described below with reference to the drawings.

FIG. 1 shows a block schematic diagram illustrating a gate driver according to an embodiment of the present disclosure. As shown in FIG. 1, the gate driver may comprises a plurality of clock signal terminals CLK, a controlling signal terminal STV0, N stages of cascaded gate driving circuits 100 and a controller 200.

The N stages of cascaded gate driving circuits 100 are cascaded together, wherein each of the N stages of cascaded gate driving circuits is coupled with the controlling signal terminal STV0 and a respective clock signal terminal of the plurality of clock signal terminals CLK. Each of the N stages of cascaded gate driving circuits 100 is configured to pull-up a voltage of an outputting terminal of the gate driving circuit according to a signal at the respective clock signal terminal, and to perform a noise reduction operation according to a signal at the controlling signal terminal STV0, wherein N is an integer greater than 1. The controller 200 is coupled with the plurality of clock signal terminals CLK and the controlling signal terminal STV0, and configured to detect signals at the plurality of clock signal terminals CLK, and to output a valid level signal to the controlling signal terminal STV0 in response to the signal at at least one of the plurality of clock signal terminals CLK being abnormal, so as to enable the N stages of cascaded gate driving circuits 100 to perform the noise reduction operation.

It should be noted that the number of the gate driving circuits 100 and the number of the clock signal terminals CLK may be different. That is to say, a plurality of gate driving circuits 100 can correspond to the same clock signal terminal CLK. For example, when there are only two clock signal terminals, the gate driving circuit 100 located in the odd numbered rows may be coupled with one of the clock signal terminals CLKs; and the gate driving circuits 100 located in the even numbered rows may be coupled with the other clock signal terminal CLK. For another example, when there are six clock signal terminals, each stage of the gate driving circuit 100 may be coupled with one of the six clock signal terminals.

It should be further noted that the N stages of gate driving circuit 100 can be connected to the same controlling signal terminal STV0, so that the controller 200 controls the N stages of gate driving circuits 100 to perform a noise reduction operation simultaneously in response to the signal at at least one of the plurality of clock signal terminals CLK being abnormal.

It should be understood that in the embodiments, "a valid level" and "an invalid level" refer to two relative potential levels at a certain node which are different from each other. For example, the valid level can be a high level and the invalid level can be a low level. Similarly, "a first level" and "a second level" refer to two relative potential levels which are different from each other, such as the first level may be a high level and the second level may be a low level.

For example, the N stages of gate driving circuits 100 can output in stages. The output from each stage of the gate driving circuit also affects the gate driving circuit connected thereto. During being driven by the gate driver or when a frequency switching operation occurs in the same frame, the controller 200 can detect signals at the plurality of clock signal terminals CLK. In response to the signal at at least one of the plurality of clock signal terminals being abnormal, a valid level signal is outputted to the controlling signal terminal STV0, so that each of the N stages of gate driving circuits 100 is noise-reduced, thereby preventing the Multi Output phenomenon resulted from dropping frames of the clock signal during the frequency switching operation. This improves the reliability of the gate driving circuit.

Figure 2:
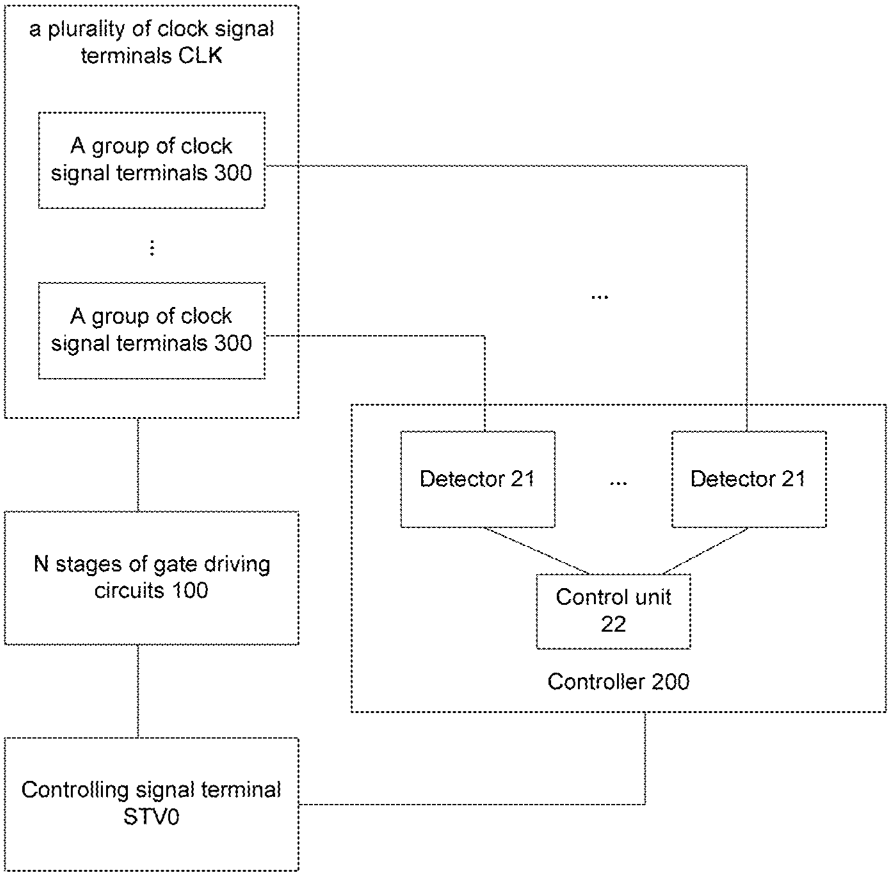
FIG. 2 shows a block schematic diagram of a gate driver according to one embodiment of the present disclosure.

As shown in FIG. 2, according to one embodiment of the disclosure, the plurality of clock signal terminals CLK are divided into P groups of clock signal terminals 300. Each group of clock signal terminals comprises two clock signal terminals, and signals applied to the two clock signal terminals are inverted from each other, wherein P is a positive integer. The controller 200 is further configured to: compare signals at the two clock signal terminals in each group 300, and in response to levels of the signals at the two clock signal terminals being the same, determine that at least one of the signals is abnormal; and output the valid level signal to the controlling signal terminal STV0, in response to determining that the at least one of the signals is abnormal.

The signals at the two clock signals being inverted with each other may indicate that when the signal at one clock signal terminal is high, the signal at the other clock signal terminal is low, and when the signal at the one clock signal terminal is low, the signal at the other clock signal terminal is high. In other words, the levels of the two signals that are mutually inverted are not the same at the same time.

That is, the controller 200 can detect the signals at the paired clock signal terminals. Since the signals at the paired clock signal terminals should be inverted with each other, when the levels of the signals at the two clock signal terminals are the same, it is determined that at least one of the signals is abnormal. The controller 200 can set the controlling signal terminal STV0 to the valid level, so that the N stages of gate driving circuits 100 performs the noise reduction operation, thereby preventing the Multi Output phenomenon and improving the reliability of the gate driving circuit.

Figure 3:
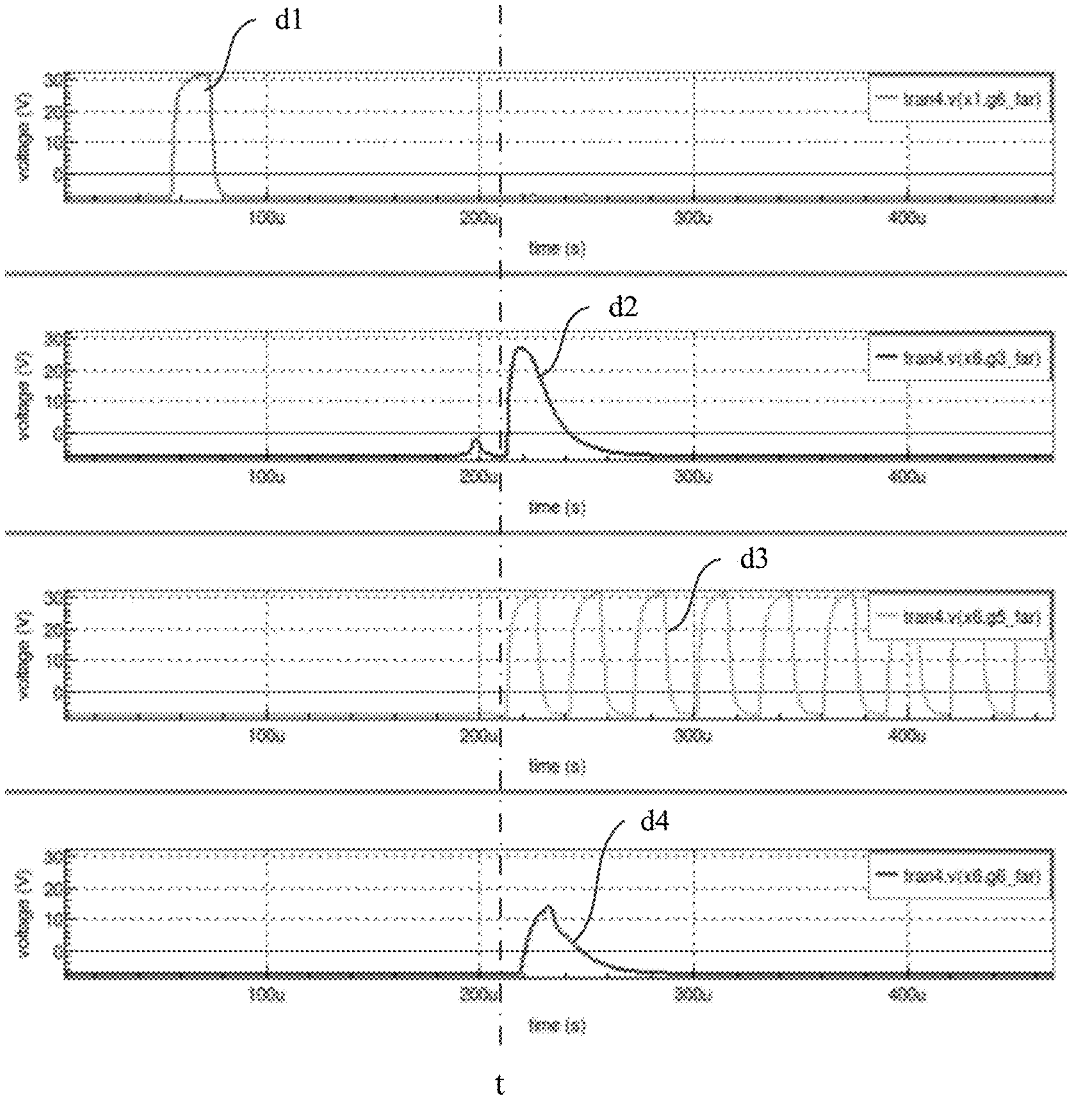
FIG. 3 shows a schematic diagram of multiple outputs generated when performing a frequency switching operation.

The Multi Output phenomenon can refer to the continuous output of the same stage of gate driving circuit, resulting in simultaneous output of the gate driving circuit that should not be simultaneously output. For example, FIG. 3 shows a schematic diagram of multiple outputs generated when performing a frequency switching operation. In the example of FIG. 3, the curve d1, the curve d2, the curve d3, and the curve d4 correspond to output signals from the 4 stages of gate driving circuits among the N stages of gate driving circuits 100, respectively. As shown in FIG. 3, before time t, the output signal is normal, and no multi-output phenomenon occurs. At time t, the frame of the clock signal is lost when performing the frequency switching operation, resulting in a multi-output phenomenon in the curve d3. That is, a plurality of signals is continuously output. Further, the voltages of the curve d2 and the curve d4 become abnormal (lower).

In a case that there are six clock signal terminals, the three stages of gate driving circuits are allowed to simultaneously output, that is, the curve d2, the curve d3, and the curve d4 are simultaneously output at time t.

Figure 4:
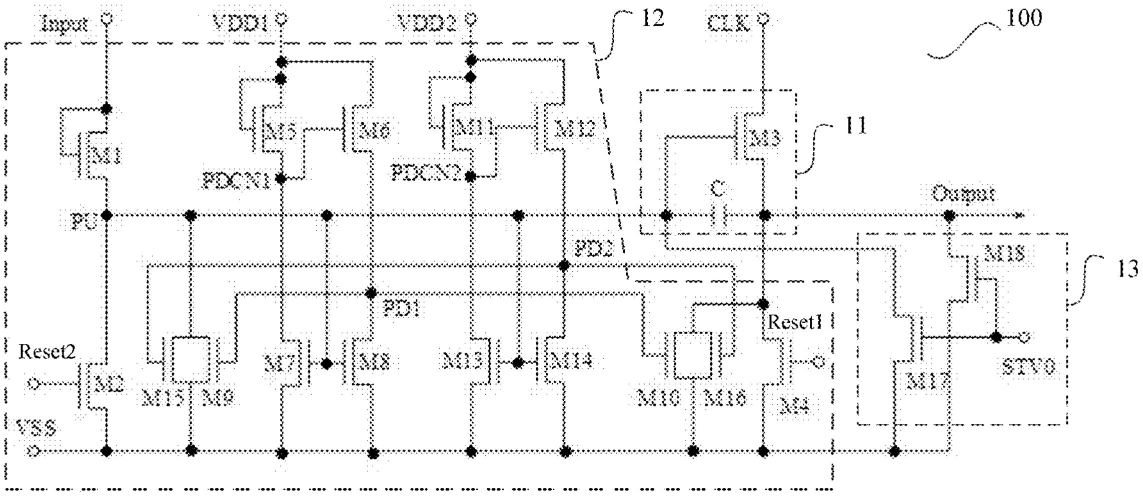
FIG. 4 shows a circuit schematic diagram illustrating a gate driving circuit of a gate driver according to an embodiment of the present disclosure.
Figure 5:
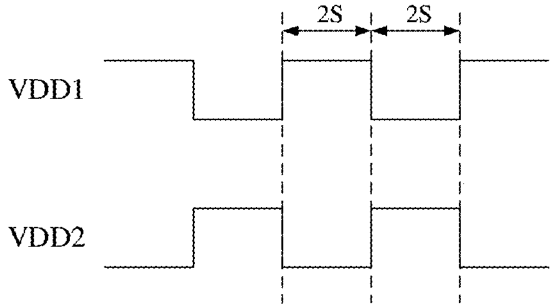
FIG. 5 shows waveform diagrams of signals at a second power supply terminal and a third power supply terminal according to an embodiment of the present disclosure.

As shown in FIGS. 4 and 5, according to an specific example of the embodiment of the disclosure, each of the N stages of cascaded gate driving circuits 100 comprises a pulling-up sub-circuit 11, a drive control sub-circuit 12, and a pulling-down sub-circuit 13. The pulling-up sub-circuit 11 has a first terminal coupled with the drive control sub-circuit 12 at a first node PU, a second terminal coupled with the respective clock signal terminal CLK, and a third terminal coupled with the outputting terminal Output of the gate driving circuit. The pulling-down sub-circuit 13 has a first terminal coupled with the first node PU, a second terminal coupled with the outputting terminal Output of the gate driving circuit, and a third terminal coupled with the controlling signal terminal STV0. The pulling-down sub-circuit 13 is configured to pull-down the voltage of the first node PU and the outputting terminal Output of the gate driving circuit in response to the controlling signal terminal STV0 is at the valid level, so as to enable the gate driving circuit 100 performing a noise reduction operation.

As shown in FIG. 4, the pulling-up sub-circuit 11 may comprise a transistor M3 and a capacitor C. The transistor M3 has a gate coupled with the drive control sub-circuit 12 at the first node PU, and a first electrode coupled with the corresponding clock signal terminal CLK, and a second electrode coupled with the outputting terminal Output of the gate driving circuit. The capacitor C has an electrode coupled with the first node PU, and another electrode coupled with the second electrode of the transistor M3.

Each of the N stages of gate driving circuits 100 further has an inputting terminal Input, a first resetting terminal Reset1, a second resetting terminal Reset2, a second power supply terminal VDD1, and a third power supply terminal VDD2. The waveforms of the second power supply terminal VDD1 and the third power supply terminal VDD2 may be alternately at a high level as shown in FIG. 5. The drive control sub-circuit 12 is connected to the inputting terminal Input, the first resetting terminal Reset1, the second resetting terminal Reset2, the second power supply terminal VDD1, and the third power supply terminal VDD2, respectively. The drive control sub-circuit 12 comprises transistors M1-M2 and M4-M16. The connection relationship of the transistors M1-M2 and M4-M16 can be as shown in FIG. 4, and details are not described herein. The transistors M5-M10 are implemented as a first pulling-down circuit, the transistors M11-M16 are implemented as a second pulling-down circuit, the transistor M1 is implemented as an inputting circuit, and the transistor M2 and the transistor M4 are implemented as a resetting circuit.

Referring to the embodiment of FIG. 4, a driving process of the gate driving circuit 100 may include: the first pulling-down circuit and the second pulling-down circuit pull-down the potential of the first node PU alternately, that is, the first pulling-down circuit pulls down the potential of the first node PU when the second power supply terminal VDD1 is at a high level, and the second pulling-down circuit pulls down the potential of the first node PU when the third power supply terminal VDD2 is at a high level. Subsequently, when the signal at the inputting terminal is at the high level, the inputting circuit transmits the signal at the inputting terminal to the first node PU to charge the capacitor C, turns on the transistor M3, and turns off the first pulling-down circuit and the second pulling-down circuit. When the signal at the corresponding clock signal terminal is at the high level, the pulling-up sub-circuit 11 pulls-up the voltage of the outputting terminal Output of the gate driving circuit, so as to drive a corresponding pixel to be turned on. Subsequently, the transistor M2 resets the first node PU by the first power supply terminal VSS when the signal of the second resetting terminal is at the valid level. The transistor M3 pulls-down the level of the outputting terminal Output of the gate driving circuit by the first power supply terminal VSS when the signal of the first resetting terminal is at the valid level, thereby performing the resetting.

As shown in FIG. 4, the pulling-down sub-circuit 13 may comprise a first transistor M17 and a second transistor M18, the first transistor M17 has a gate coupled with a gate of the second transistor M18 and the controlling signal terminal STV0, a first electrode coupled with the first node PU and a second electrode coupled with a first power supply terminal VSS. The second transistor M18 has a first electrode coupled with the outputting terminal Output of the gate driving circuit and a second electrode coupled with the first power supply terminal VSS.

If an abnormality occurs in the signal at the at least one clock signal terminal CLK, the control signal terminal STV0 is set to a valid level, so that the first transistor M17 and the second transistor M18 are turned on. The first node PU and the outputting terminal Output of each stage of the gate driving circuit 100 are discharged, thereby preventing the Multi Output phenomenon caused by losing frames of the clock signal during the frequency switching operation, and improving the reliability of the gate driving circuit. According to an embodiment of the present disclosure, the term "noise reduction operation" indicates that the first node PU and the outputting terminal Output are discharged.

It should be noted that, before each frame is turned on, the control signal terminal STV0 is also set to the valid level, for example, the high level, for a period of time. Then the first transistor M17 and the second transistor M18 are turned on, and the first node PU and the outputting terminal of the gate driving circuit are turned on.

According to an embodiment of the disclosure, the P groups of the clock signal terminals 300 comprise 2P clock signal terminals, and the 2P clock signal terminals are sequentially coupled with the $n^{th}$ stage to the $(n+2P-1)^{th}$ stage of the gate driving circuits, and signals at the 2P clock signal terminals are sequentially shifted by a preset phase so that the signal at the $m^{th}$ clock signal terminal and the signal at the $(P+m)^{th}$ clock signal terminal are inverted to each other, wherein m=1, 2, . . . , P, n=1, 2, . . . , (N−2P+1).

In other words, the 2P clock signal terminals can be sequentially coupled with 2P of gate driving circuits which are continuous among the N stages of gate driving circuits 100, and sequentially coupled with the next 2P of gate driving circuits. Such connection is repeated until the N stages of gate driving circuits 100 are connected.

For example, when P is equal to 1, the signals at the two clock signal terminals in the same group are mutually inverted. These two clock signal terminals may be sequentially connected to the first-stage of gate driving circuit and the second-stage of gate driving circuit, then sequentially connected to the third-stage of gate driving circuit and the fourth-stage of gate driving circuit, after that, sequentially connected to the fifth-stage of gate driving circuit and the sixth-stage of gate driving circuit, . . . , and so on, until the N stages of gate driving circuit 100 are all connected. That is, one of the two clock signal terminals can be connected to the odd-numbered gate driving circuit, and the other of the two clock signal terminals can be connected to the even-numbered gate driving circuit.

Figure 7:
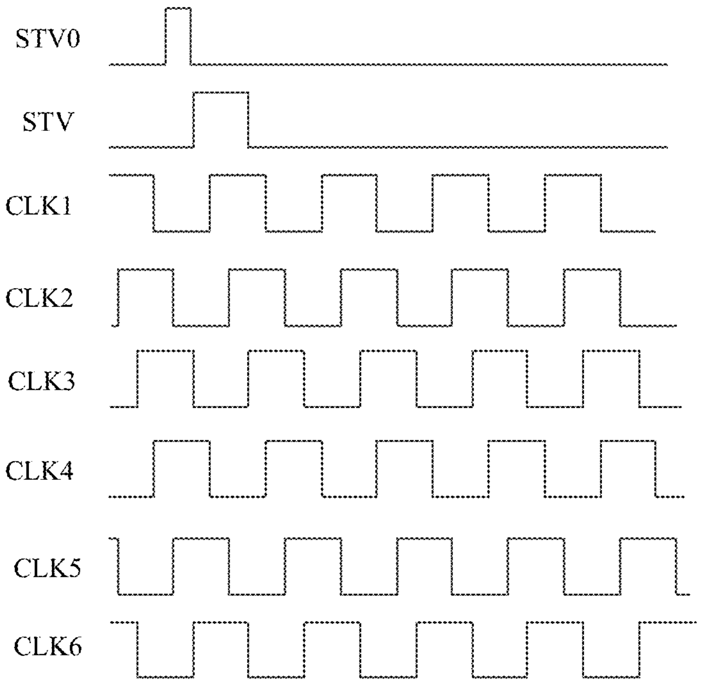
FIG. 7 shows waveform diagrams of a first to sixth clock signals in a gate driver according to an embodiment of the present disclosure.

For example, as shown in FIG. 7, when P is equal to 3, there are six clock signal terminals CLK1-CLK6. Signals at the first clock signal terminal CLK1 and the fourth clock signal terminal CLK4 are mutually inverted, signals at the second clock signal terminal CLK2 and the fifth clock signal terminal CLK5 are mutually inverted and signals at the third clock signal terminal CLK3 and the sixth clock signal terminal CLK6 are mutually inverted. That is to say, under normal conditions, CLK1 and CLK4, CLK2 and CLK5, CLK3 and CLK6 are three sets of signals that are inverted with each other. The six clock signal terminals may be first connected to the first stage of gate driving circuit to the sixth stage of gate driving circuit, and then sequentially connected to the seventh stage of gate driving circuit to the twelfth stage of gate driving circuit, and then connected to the thirteenth stage of gate driving circuit and the eighteenth stage of gate driving circuit, . . . , and so on, until the N stages of gate driving circuit 100 are all connected.

According to a specific example of the embodiment of the present disclosure, the structure of the N stages of cascaded gate driving circuits is as follows.

When P is equal to 1, each of the N stages of cascaded gate driving circuits has an inputting terminal Input, a first resetting terminal Reset1 and a second resetting terminal Reset2. Each stage of gate driving circuit may have its inputting terminal Input coupled with an outputting terminal Output of its previous stage of gate driving circuit, and the first resetting terminal Reset1 and the second resetting terminal Reset2 coupled with an outputting terminal Output of its next stage of gate driving circuit.

It should be noted that the previous stage of gate driving circuit refers to the gate driving circuit located in the previous stage of the current gate driving circuit, and the next stage of gate driving circuit refers to the gate driving circuit located in the next stage of the current gate driving circuit. Taking the $j^{th}$ stage as an example, its previous stage of gate driving circuit refers to the $(j-1)^{th}$ stage of gate driving circuit, and its next stage of gate driving circuit refers to the $(j+1)^{th}$ stage of gate driving circuit.

When P is greater than 1, each of the N stages of cascaded gate driving circuits 100 has an inputting terminal Input, a first resetting terminal Reset1 and a second resetting terminal Reset2. Each stage of gate driving circuit may have its inputting terminal Input coupled with an outputting terminal Output of previous P stage of gate driving circuit, the first resetting terminal Reset1 coupled with an outputting terminal Output of next P stage of gate driving circuit, and the second resetting terminal Reset2 coupled with an outputting terminal Output of next (P+1) stage of gate driving circuit.

It should be noted that the previous P stage of gate driving circuit refers to the gate driving circuit located in the previous P stage of the current gate driving circuit, the next P stage of gate driving circuit refers to the gate driving circuit located in the next P stage of the current gate driving circuit, and the next P+1 stage of gate driving circuit refers to the gate driving circuit located in the next P+1 stage of the current gate driving circuit. Taking the $i^{th}$ stage as an example, its previous P stage of gate driving circuit refers to the $(i-P)^{th}$ stage of gate driving circuit, its next P stage of gate driving circuit refers to the $(i+P)^{th}$ stage of gate driving circuit, and its next P+1 stage of gate driving circuit refers to the $(i+P+1)^{th}$ stage of gate driving circuit.

It can be understood that when the current stage of gate driving circuit does not have the previous P stage of gate driving circuit, the inputting terminal of the current stage of gate driving circuit can be connected to the preset controlling signal terminal STV.

The gate driver of the embodiment of the present disclosure will be described in detail below with reference to FIG. 6.

Figure 6:
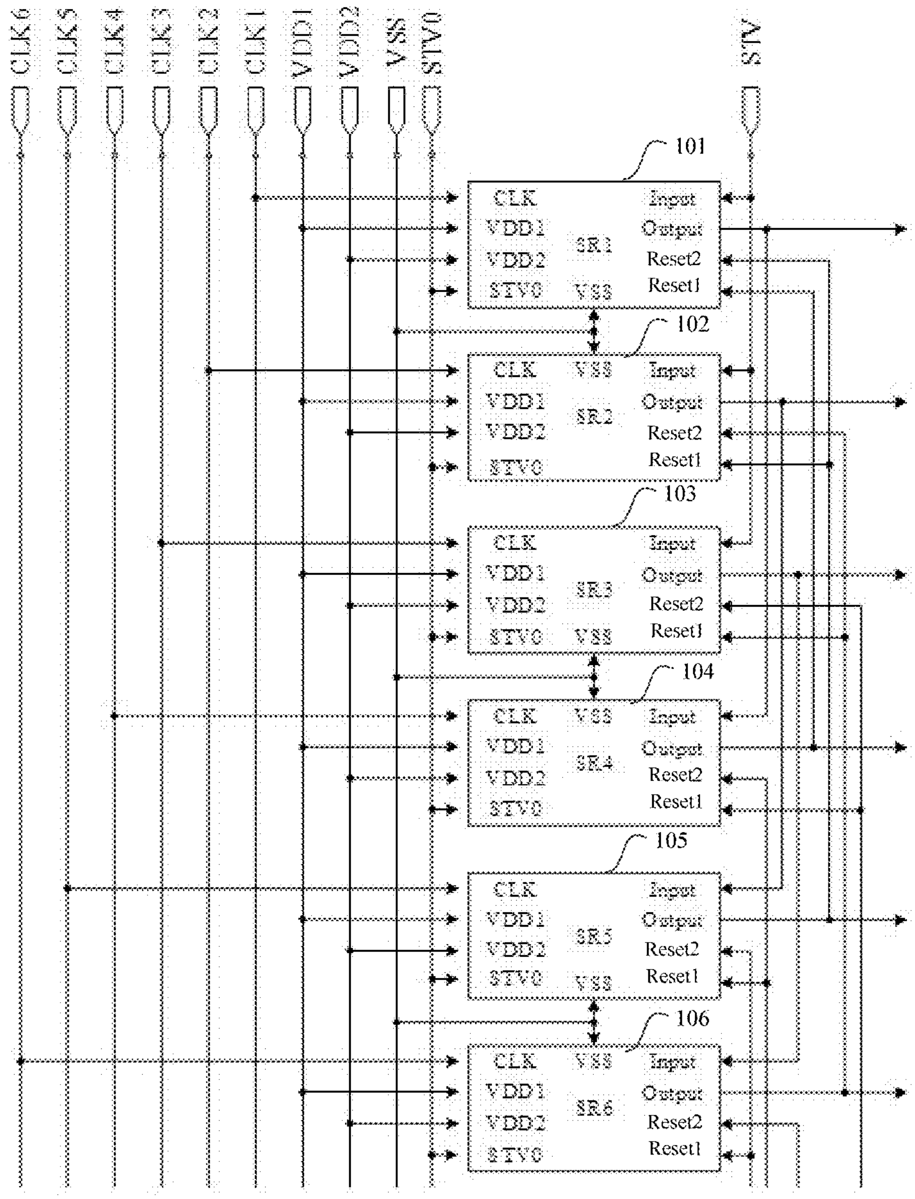
FIG. 6 shows a schematic diagram illustrating a cascade structure of gate driving circuits in a gate driver according to an embodiment of the present disclosure.

As shown in FIG. 6, there are sixth clock signal terminals CLK1-CLK6, wherein the controller 200 is configured to detect signals at the first to sixth clock signal terminals CLK1-CLK6. When the signal at at least one of the plurality of clock signal terminals becomes abnormal, a valid level signal is outputted to the controlling signal terminal STV0.

Further, as shown in FIG. 6, the structure of the N stages of cascaded gate driving circuit may be as follows: the inputting terminal Input of each stage of the gate driving circuit being connected to the outputting terminal Output of the previous three stages of the gate driving circuit; the first resetting terminal Reset1 of each stage of the gate driving circuit being connected to the outputting terminal Output of the next three stage of gate driving circuit; and the second resetting terminal Reset2 of each stage of the gate driving circuit being connected to the outputting terminal Output of the next four stage of gate driving circuit. Among them, the first stage of gate driving circuit, the second stage of gate driving circuit and the third stage of gate driving circuit in the N stages of gate driving circuits have no corresponding previous three stage of gate driving circuit. Therefore, the inputting terminals Input of the first stage of gate driving circuit, the second stage of gate driving circuit, and the third stage of gate driving circuit are all connected to the preset controlling signal terminal STV.

It can be understood that the N stages of gate driving circuits are related to each other. If the frequency of the signal at a certain clock signal terminal CLK changes within the same frame, especially when there is signal confusion, the output of the N stages of gate driving circuits will generate a Multi Output phenomenon.

As shown in FIG. 6, the structure of the N stages of cascaded gate driving circuit is described in detail by taking the previous six stages of gate driving circuits in the N stages of gate driving circuit 100 as an example. The previous six stages of gate driving circuits, that is, the first to sixth stage gate driving circuits 101-106 are respectively connected to the first to sixth clock signal terminals CLK1-CLK6. The first stage of gate driving circuit 101 has its inputting terminal Input connected to the preset controlling signal terminal STV, its first resetting terminal Reset1 connected to the outputting terminal Output of the fourth stage of gate driving circuit 104, and its second resetting terminal Reset2 connected to the outputting terminal Output of the fifth stage of gate driving circuit 105. The second stage of gate driving circuit 102 has its inputting terminal Input connected to the preset controlling signal terminal STV, its first resetting terminal Reset1 connected to the outputting terminal Output of the fifth stage of gate driving circuit 105, and its second resetting terminal Reset2 connected to the outputting terminal Output of the sixth stage of gate driving circuit 106. The third stage of gate driving circuit 103 has its inputting terminal Input connected to the preset controlling signal terminal STV, its first resetting terminal Reset1 connected to the outputting terminal Output of the sixth stage of gate driving circuit 106, and its second resetting terminal Reset2 connected to the outputting terminal Output of the seventh stage of gate driving circuit. The fourth stage of gate driving circuit 104 has its inputting terminal Input connected to the outputting terminal Output of the first stage of gate driving circuit 101, its first resetting terminal Reset1 coupled to the outputting terminal Output of the seventh stage of gate driving circuit, and its second resetting terminal Reset2 connected to the outputting terminal Output of the eighth stage of gate driving circuit. The fifth stage of gate driving circuit 105 has its inputting terminal Input connected to the outputting terminal Output of the second stage of gate driving circuit 102, its first resetting terminal Reset1 connected to the outputting terminal Output of the eighth stage of gate driving circuit, and its second resetting terminal Reset2 connected to the outputting terminal Output of the ninth stage of gate driving circuit. The sixth stage of gate driving circuit 106 has its inputting terminal Input connected to the outputting terminal Output of the third stage of gate driving circuit 103, its first resetting terminal Reset1 connected to the outputting terminal Output of the ninth stage of gate driving circuit, and its second resetting terminal Reset2 connected to the outputting terminal Output of the tenth-level gate driving circuit.

Figure 8:
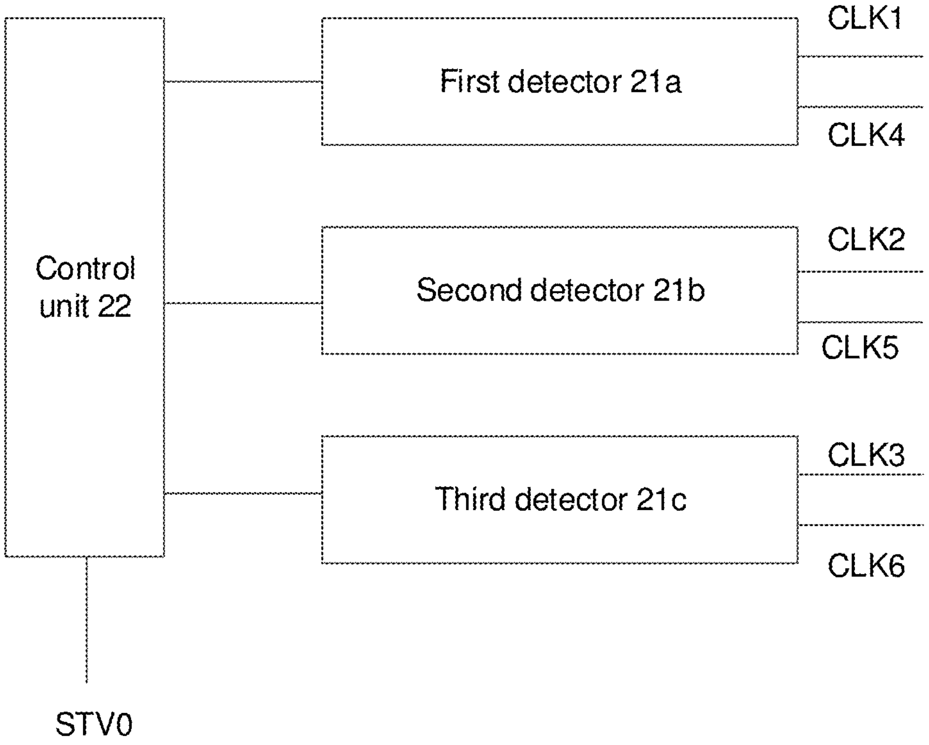
FIG. 8 shows a block schematic diagram illustrating a controller of a gate driver according to an embodiment of the present disclosure.

Further, as shown in FIG. 8, the controller 200 may include a first detector 21*a*, a second detector 21*b*, a third detector 21*c*, and a control unit 22. The first detector 21*a* has a first inputting terminal connected to the first clock signal terminal CLK1 and a second inputting terminal connected to the fourth clock signal terminal CLK4. The first detector 21*a* is configured to compare the signal at the first clock signal terminal CLK1 with the signal at the fourth clock signal terminal CLK4, and in response to the signals at the first clock signal terminals CLK1 and the fourth clock signal terminal CLK4 having the same level, determine that the first clock signal terminals CLK1 or the fourth clock signal terminal CLK4 is abnormal. The second detector 21*b* has a first inputting terminal connected to the second clock signal terminal CLK2 and a second inputting terminal connected to the fifth clock signal terminal CLK5. The second detector 21*b* is configured to compare the signal at the second clock signal terminal CLK2 with the signal at the fifth clock signal terminal CLK5, and in response to the signals at the second clock signal terminals CLK2 and the fifth clock signal terminal CLK5 having the same level, determine that the second clock signal terminals CLK2 and the fifth clock signal terminal CLK5 is abnormal. The third detector 21*c* has a first inputting terminal connected to the third clock signal terminal CLK3 and a second inputting terminal connected to the third clock signal terminal CLK6. The third detector 21*c* is configured to compare the signal at the third clock signal terminal CLK3 with the signal at the sixth clock signal terminal CLK6, and in response to the signals at the third clock signal terminals CLK3 and the sixth clock signal terminal CLK6 having the same level, determine that the third clock signal terminals CLK3 or the sixth clock signal terminal CLK6 is abnormal. The control unit 22 is respectively connected to the outputting terminal of the first detector 21*a*, the outputting terminal of the second detector 21*b*, the outputting terminal of the third detector 21*c*, and the controlling signal terminal. The control unit 22 is configured to output the valid level signal to the controlling signal terminal STV0 in response to at least one of the clock signal terminals CLK1-CLK6 being abnormal.

That is, the first clock signal terminal CLK1 and the fourth clock signal terminal CLK4 are connected to the first detector 21*a*, the second clock signal terminal CLK2 and the fifth clock signal terminal CLK5 are connected to the second detector 21*b*, and the clock signal terminal CLK3 and the third clock signal terminal CLK6 are connected to the third detector 21*c*. When the signals at the two clock signal terminals which are connected to the same detector has the same level, a first level signal such as a high level signal is sent to the control unit 22. When the control unit 22 receives the high level signal from any of the detectors, the controlling signal terminal STV0 is set to a valid level, for example, a high level, so that the first transistor M17 and the second transistor M18 of all gate driving circuits are turned on. Thus, the first node PU and the outputting terminal Output of each stage of gate driving circuit perform a noise reduction operation, to prevent a Multi Output phenomenon.

According to a particular example of an embodiment of the present disclosure, both the detector and the control unit are implemented by logic circuits such as AND gates, OR gates, and NOT gates. The logic circuit is configured to output a first level signal when the levels of the input two clock signal terminals are the same, and output a valid level signal according to the first level signal.

That is, each detector and control unit can be implemented by an AND gate, an OR gate, and a NOT gate. For example, each detector can include an OR gate, a first NAND gate, and a second NAND gate. The OR gate has a first inputting terminal connected to a corresponding clock signal terminal, and a second inputting terminal connected to the corresponding other clock signal terminal. The first NAND gate has a first inputting terminal connected to the corresponding clock signal terminal and a second inputting terminal connected to the corresponding other clock signal terminal. The second NAND gate has a first inputting terminal connected to the outputting terminal of the OR gate, and a second inputting terminal connected to the outputting terminal of the first NAND gate, and a outputting terminal connected to the controller. Assuming that a high level is represented by 1 and a low level is represented by 0, the truth table corresponding to the detector can be as shown in Table 1 below:

TABLE 1

| detector | | |
|---|---|---|
| inputting terminal | inputting terminal | outputting terminal |
| 0 | 0 | 1 |
| 0 | 1 | 0 |
| 1 | 0 | 0 |
| 1 | 1 | 1 |

The control unit 22 can include a first OR gate and a second OR gate. The first OR gate has a first inputting terminal coupled to the outputting terminal of the first detector 21*a* and a second inputting terminal coupled to the outputting terminal of the second detector 21*b*. The second OR gate has a first inputting terminal connected to the outputting terminal of the first OR gate, a second inputting terminal connected to the outputting terminal of the third detector 21*c*, and an outputting terminal connected to the controlling signal terminal STV0. The truth table corresponding to the control unit 22 can be as shown in Table 2 below:

TABLE 2

| Control Unit | | | |
|---|---|---|---|
| inputting terminal | inputting terminal | inputting terminal | outputting terminal |
| 0 | 0 | 0 | 0 |
| 0 | 0 | 1 | 1 |
| 0 | 1 | 0 | 1 |
| 0 | 1 | 1 | 1 |
| 1 | 0 | 0 | 1 |
| 1 | 0 | 1 | 1 |
| 1 | 1 | 0 | 1 |
| 1 | 1 | 1 | 1 |

It can be understood that as long as the logic circuit is capable of realizing the truth table of Table 1, it can be used as the detector, and as long as the logic circuit is capable of realizing the truth table of Table 2, it can be used as the control unit.

According to a specific example of an embodiment of the present disclosure, the gate driver may be a gate driving circuit fabricated by a GOA (Gate On Array) technology.

In summary, according to the gate driver of the embodiment of the present disclosure, each of the N stages of cascaded gate driving circuits is coupled with the controlling signal terminal and a respective clock signal terminal of the plurality of clock signal terminals. Each of the N stages of cascaded gate driving circuits is configured to pull-up a voltage of an outputting terminal of the gate driving circuit according to a signal at the respective clock signal terminal, and to perform a noise reduction operation according to a signal at the controlling signal terminal. The controller is configured to detect signals at the plurality of clock signal terminals, and to output a valid level signal to the controlling signal terminal in response to the signal at at least one of the plurality of clock signal terminals being abnormal, so as to enable the N stages of cascaded gate driving circuits to perform the noise reduction operation. This can prevent a Multi Output phenomenon, prevent the transistors of the gate driving circuits from being damaged, and improve the reliability of the gate driver.

Based on the above embodiments, the present disclosure further provides a display apparatus including the gate driver of the foregoing embodiments.

According to the display apparatus of the embodiments of the present disclosure, the gate driving circuit can prevent the occurrence of multiple outputs, avoid damage to the transistors of the gate drive circuit, and improve the reliability of the gate driver.

The embodiments of the present disclosure also propose a method of controlling a gate driver.

Figure 9:
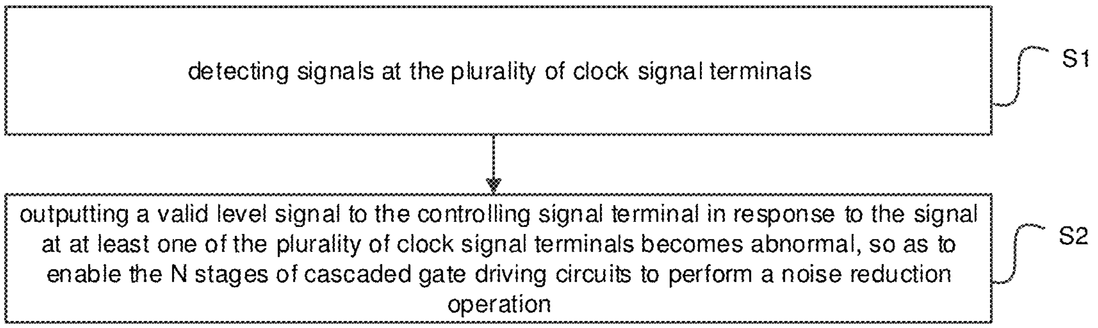
FIG. 9 shows a flow chart illustrating a method for controlling a gate driver according to an embodiment of the present disclosure.

FIG. 9 shows a flow chart illustrating a method for controlling a gate driver according to an embodiment of the present disclosure. As shown in FIG. 9, the method of controlling the gate driver includes following steps.

at S1, detecting signals at the plurality of clock signal terminals; and at S2, outputting a valid level signal to the controlling signal terminal in response to the signal at at least one of the plurality of clock signal terminals becomes abnormal, so as to enable the N stages of cascaded gate driving circuits to perform a noise reduction operation.

According to an embodiment of the present disclosure, the plurality of clock signal terminals are divided into P groups of clock signal terminals, each group of clock signal terminals comprises two clock signal terminals, and signals applied to the two clock signal terminals are inverted to each other, wherein P is a positive integer. Detecting signals at the plurality of clock signal terminals comprises: comparing signals at the two clock signal terminals in each group, determining that at least one of the signals is abnormal, in response to the levels of the signals at the two clock signal terminals being the same; and outputting the valid level signal to the controlling signal terminal, in response to determining that the at least one of the signals is abnormal.

According to an embodiment of the present disclosure, the plurality of clock signal terminals include first to sixth clock signal terminals, and the signals at the first clock signal terminal and the fourth clock signal terminal are mutually inverted, and the signals at the second clock signal end and the fifth clock signal terminal are end, and the signal at the third clock signal terminal and the sixth clock signal terminal are mutually inverted.

The detecting of the signals at the plurality of clock signal terminals includes:

comparing the signal at the first clock signal terminal with the signal at the fourth clock signal terminal, and determining that the first clock signal terminal or the fourth clock signal terminal is abnormal when the first clock signal terminal and the fourth clock signal terminal are at the same level; comparing the signal at the second clock signal terminal with the signal at the fifth clock signal terminal, and determine that the second clock signal terminal or the fifth clock signal terminal is abnormal when the second clock signal terminal and the fifth clock signal terminal are at the same level; comparing the signal at the third clock signal terminal with the signal at the sixth clock signal terminal, and determine that the third clock signal terminal or the sixth clock signal terminal is abnormal when the third clock signal terminal and the sixth clock signal terminal are at the same level; and output a valid level signal to the controlling signal terminal in response to at least one of the sixth clock signal terminals being abnormal.

It should be noted that the foregoing explanation of the gate driver is also applicable to the method for controlling the gate driver, and details are not described herein again.

In order to implement the above embodiments, an embodiment of the present disclosure further provides a non-transitory readable storage medium storing a program for controlling a gate driver, when being performed by a processor, the program implements the method for controlling the gate driver of foregoing embodiments.

In the description of the present disclosure, the reference to terms “one embodiment”, “some embodiments”, “an example”, “a specific example”, or “some examples” and the like means a specific feature, a structure, a material, or a feature described in connection with the embodiment or example is included in at least one embodiment or example of embodiments of the present disclosure. In the specification, the representation of the above terms is not necessarily directed to the same embodiment or example. Furthermore, the particular features, structures, materials, or characteristics described may be combined in a suitable manner in any one or more embodiments or examples. In addition, various embodiments or examples described in the specification, as well as features of various embodiments or examples, may be combined and combined without conflicting.

Moreover, the terms “first” and “second” are used for descriptive purpose only and are not to be construed as indicating or implying a relative importance or implicitly indicating the number of identified technical features. Thus, the feature defining by “first” or “second” may include at least one of the features, either explicitly or implicitly. In the description of the embodiments of the present disclosure, the term “a plurality of” means at least two, such as two, three, etc., unless specifically defined otherwise.

Any process or method description in the flowcharts or otherwise described herein may be understood to represent sub-circuits, segments or parts of code comprising one or more executable instructions for implementing the steps of the custom logic function or process. The scope of the preferred embodiments of the present disclosure includes additional implementations in which the functions may be performed in a substantially simultaneous manner or in the reverse order, depending on the functions involved. This should be understood by those skilled in the art to which the embodiments of the disclosed embodiments pertain.

The logics and/or steps represented in the flowchart or otherwise described herein, for example, may be considered as an ordered list of executable instructions for implementing logical functions, and may be embodied in any computer readable medium, so as to be used by or in conjunction with an instruction execution system, apparatus, or device (such as, a computer-based system, a system including a processor, or other system that can fetch instructions from an instruction execution system, apparatus, or device and perform the fetched instructions). For this specification, a “computer-readable medium” can be any apparatus that can contain, store, communicate, propagate, or transport a program for use in an instruction execution system, apparatus, or device, or in conjunction with such an instruction execution system, apparatus, or device. More specific examples (non-exhaustive list) of computer readable media may include: electrical connections (electronic devices) having one or more wires, portable computer disk cartridges (magnetic devices), a random access memory (RAM), a read only memory (ROM), an erasable programmable read only memory (EPROM or flash memory), fiber optic devices, and a portable compact disk read only memory (CDROM). In addition, the computer readable medium may even be a paper or other suitable medium on which the program can be printed, since the medium (for example, paper or other medium) may be optically scanned, edited, interpreted or processed by other suitable procedures, so as to obtain the program electronically and then store it in a computer memory.

It should be understood that portions of the embodiments of the present disclosure can be implemented with hardware, software, firmware, or a combination thereof. In the above-described embodiments, a plurality of steps or methods may be implemented in software or firmware stored in a memory and executed by a suitable instruction execution system. For example, if it is implemented in hardware as in another embodiment, it can be implemented by any one or combination of the following techniques known in the art: discrete logics circuits with logic gates for implementing logic functions on data signals, application specific integrated circuits with suitable combination logic gates, programmable gate arrays (PGAs), field programmable gate arrays (FPGAs), and the like.

Those skilled in the art can understand that all or part of the steps carried by the method of implementing the above embodiments can be implemented by a program instructing related hardware. The program can be stored in a computer readable storage medium. When being executed, the program can implement one or a combination of the steps of the method of foregoing embodiments.

In addition, each functional unit in the embodiment of the present disclosure may be integrated into one processing sub-circuit, or separately exist in physical, or two or more units may be integrated into one sub-circuit. The above integrated sub-circuit can be implemented in the form of hardware or in the form of software-functioned sub-circuits. If implemented in the form of software-functioned sub-circuits which are sold or used as separate products, the integrated sub-circuits may also be stored in a computer readable storage medium.

The storage medium mentioned above may be a read only memory, a magnetic disk or an optical disk and the like. While the embodiments of the disclosed embodiments have been shown and described, it is understood that the foregoing embodiments are illustrative and not restrictive, and changes, modifications, substitutions and variations of the above-described embodiments are possible within the scope of the invention.

We claim:

1. A gate driver comprising:

a plurality of clock signal terminals;

a controlling signal terminal;

N stages of cascaded gate driving circuits, wherein each of the N stages of cascaded gate driving circuits is coupled with the controlling signal terminal and a respective clock signal terminal of the plurality of clock signal terminals, and wherein each of the N stages of cascaded gate driving circuits is configured to pull-up a voltage of an outputting terminal of the gate driving circuit according to a signal at the respective clock signal terminal, and to perform a noise reduction operation according to a signal at the controlling signal terminal, wherein N is an integer greater than 1; and a controller, wherein the controller is coupled with the plurality of clock signal terminals and the controlling signal terminal, and is configured to detect signals at the plurality of clock signal terminals, and to output a valid level signal to the controlling signal terminal in response to the signal at at least one of the plurality of clock signal terminals being abnormal, so as to enable the N stages of cascaded gate driving circuits to perform the noise reduction operation.

2. The gate driver of claim 1, wherein the plurality of clock signal terminals are divided into P groups of clock signal terminals, each group of the P groups of clock signal terminals comprises two clock signal terminals, and signals applied to the two clock signal terminals in each group are inverted with respect to each other, wherein P is a positive integer;

wherein the controller is further configured to:

compare signals at the two clock signal terminals in each group, and in response to levels of the signals at the two clock signal terminals being the same, determine that at least one of the signals is abnormal; and output the valid level signal to the controlling signal terminal, in response to determining that the at least one of the signals is abnormal.

3. The gate driver of claim 2, wherein each of the N stages of gate driving circuits has an inputting terminal, a first resetting terminal, and a second resetting terminal;

wherein P is equal to 1, and the $j^{th}$ stage of the gate driving circuit has its inputting terminal coupled with the outputting terminal of the $(j-1)^{th}$ stage of the gate driving circuit, its first resetting terminal and its second resetting terminal coupled with the outputting terminal of the $(j+1)^{th}$ stage of the gate driving circuit, j=2, . . . , (N−1).

4. The gate driver of claim 2, wherein each of the N stages of gate driving circuits has an inputting terminal, a first resetting terminal, and a second resetting terminal;

wherein P is greater than 1, and the $j^{th}$ stage of the gate driving circuit has its inputting terminal coupled with the outputting terminal of the $(i-P)^{th}$ stage of the gate driving circuit, its first resetting terminal coupled with the outputting terminal of the $(i+P)^{th}$ stage of the gate driving circuit and its second resetting terminal coupled with the outputting terminal of the $(i+P+1)^{th}$ stage of the gate driving circuit, i=(P+1), . . . , (N−1−P).

5. The gate driver of claim 2, wherein the P groups of the clock signal terminals comprise 2P clock signal terminals, and the 2P clock signal terminals are sequentially coupled with the $n^{th}$ stage to the $(n+2P-1)^{th}$ stage of the gate driving circuits, and signals at the 2P clock signal terminals are sequentially shifted by a preset phase so that the signal at the $m^{th}$ clock signal terminal and the signal at the $(P+m)^{th}$ clock signal terminal are inverted to each other, wherein m=1, 2, . . . , P, n=1, 2, . . . , (N−2P+1).

6. The gate driver of claim 2, wherein the controller comprises a logic circuit configured to output a first level signal in response to the levels of the signals at the two clock signal terminals being the same, and to output the valid level signal according to the first level signal.

7. The gate driver of claim 1, wherein each of the N stages of cascaded gate driving circuits comprises a pulling-up sub-circuit, a drive control sub-circuit, and a pulling-down sub-circuit, wherein:

the pulling-up sub-circuit has a first terminal coupled with the drive control sub-circuit at a first node, a second terminal coupled with the respective clock signal terminal, and a third terminal coupled with the outputting terminal of the gate driving circuit; and the pulling-down sub-circuit has a first terminal coupled with the first node, a second terminal coupled with the outputting terminal of the gate driving circuit, and a third terminal coupled with the controlling signal terminal, and the pulling-down sub-circuit is configured to pull-down the voltage of the first node and the outputting terminal of the gate driving circuit in response to the controlling signal terminal being at the valid level.

8. The gate driver of claim 7, wherein the pulling-down sub-circuit comprises a first transistor and a second transistor, the first transistor having a gate coupled with a gate of the second transistor and the controlling signal terminal, a first electrode coupled with the first node and a second electrode coupled with a first power supply terminal, and the second transistor having a first electrode coupled with the outputting terminal of the gate driving circuit and a second electrode coupled with the first power supply terminal.

9. A display apparatus comprising the gate driver of claim 1.

10. A method for controlling a gate driver, the gate driver comprising a plurality of clock signal terminals, a controlling signal terminal, and N stages of cascaded gate driving circuits, wherein each of the N stages of cascaded gate driving circuits is coupled with the controlling signal terminal and a respective clock signal terminal of the plurality of clock signal terminals respectively, wherein N is an integer greater than 1, the method comprising:

detecting signals at the plurality of clock signal terminals, and outputting a valid level signal to the controlling signal terminal in response to the signal at at least one of the plurality of clock signal terminals being detected as abnormal, so as to enable the N stages of cascaded gate driving circuits to perform a noise reduction operation.

11. The method of claim 10, wherein the plurality of clock signal terminals are divided into P groups of clock signal terminals, each group of the P groups of clock signal terminals comprises two clock signal terminals, and signals applied to the two clock signal terminals are inverted with respect to each other, wherein P is a positive integer;

wherein detecting signals at the plurality of clock signal terminals comprises:

comparing signals at the two clock signal terminals in each group, and determining that at least one of the signals is abnormal, in response to the levels of the signals at the two clock signal terminals being the same; and wherein outputting the valid level signal to the controlling signal terminal is performed in response to determining that at least one of the signals is abnormal.

12. A non-transitory computer readable storage medium storing a program for controlling a gate driver, which when being performed by a processor, implements the method for controlling the gate driver of claim 10.

* * * * *